United States Patent Office 3,209,005
Patented Sept. 28, 1965

3,209,005
β-2-OXY - 1,2,3,4,6,7 - HEXAHYDRO-11bH-BENZO[a] QUINOLIZINES AND PROCESSES THEREFOR
Arnold Brossi, Verona, N.J., and Otto Schnider, Basel, and Hans Bruderer, Riehen, Switzerland, assignors to Hoffmann-La Roche Inc., Nutley, N.J., a corporation of New Jersey
No Drawing. Filed June 6, 1963, Ser. No. 285,906
Claims priority, application Switzerland, June 15, 1962, 7,280/62
11 Claims. (Cl. 260—288)

The present invention relates to a novel class of compounds. Substituted 2-hydroxy-benzo[a]quinolizines of the formula:

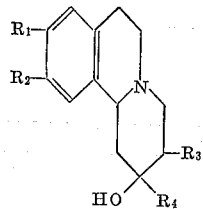

I wherein $R_1$ and $R_2$ are selected from the group consisting of, individually, hydrogen, hydroxy, acyloxy, lower alkyl, lower alkoxy, and taken together, lower alkylenedioxy; $R_3$ is selected from the group consisting of lower alkyl, lower alkenyl, and di-lower alkylamino-lower alkyl and $R_4$ is selected from the group consisting of lower alkyl, lower alkenyl, ar-lower alkyl, aryl and di-lower alkylamino-lower alkyl as well as esters, ethers and salts of these compounds have been described as being obtained by the condensation of 2-oxo-benzo[a]quinolizines (substituted by residues $R_1$, $R_2$ and $R_3$) with a metal-organic acetylene compound (e.g. with a lithium acetylide which may be alkyl-substituted) and by subsequent hydrolysis of the condensation product to form a 2-hydroxy compound and hydrogenation of the acetylene residue situated in the 2-position. These compounds were known to possess a strong narcosis potentiating effect. However, in addition to this narcosis potentiating effect, these compounds also liberate serotonin in the brain.

As is evident from the above formula, the 2-hydroxy-benzo[a]quinolizines of Formula I possess 3 asymmetric centers. Thus, there are possible 8 optical antipodes or 4 racemates of the structure of Formula I. It has now been discovered that the compounds of Formula I prepared by the lithium acetylide process, belong to only one of the stereoisomeric series possible. This stereoisomeric series should be denoted as the α-series.

One aspect of this invention constitutes the discovery of compounds of Formula I belonging to a second stereoisomeric series, the β-series. Compounds of the β-series are useful as sedatives and narcosis potentiating agents possessing a strong sedative and narcosis potentiating action. And, wherea the α-series liberates serotonin in the brain, the new compounds of the β-series, unexpectedly, do not substantially influence amine metabolism in the brain, and their administration results in no appreciable liberation of serotonin.

Compounds of the β-series can be prepared by reacting 2-oxo-benzo[a]quinolizine of the formula:

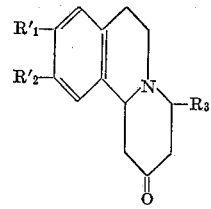

II wherein $R'_1$ and $R'_2$ are selected from the group consisting of, individually, hydrogen, acyloxy, lower alkyl, hydroxy, lower alkoxy and taken together, lower alkylenedioxy and $R_3$ has the same meaning as given above in Formula I, (obtained according to British Patent No. 789,789) with a Grignard compound of the formula:

$R_4$-Mg-Halogen                III wherein $R_4$ has the same meaning as given above under Formula I, hydrolyzing the condensation product and, if desired, converting the resulting tertiary carbinol into a salt. Furthermore, the tertiary carbinol, so obtained, can be esterified or etherified and, if desired, converted into a salt.

The term alkyl, as used above, comprehends both straight and branched chain saturated hydrocarbon groups, for example, lower alkyl groups such as, methyl, ethyl, n-propyl, isopropyl, butyl, isobutyl, 2-ethyl-butyl, hexyl and the like. Similarly, the terms, alkoxy and lower alkylenedioxy comprehend groups such as, methoxy, ethoxy, butoxy and the like or methylenedioxy, ethylenedioxy and the like, respectively. Also, the term lower alkenyl comprehends groups such as allyl, methallyl, β,β-dimethallyl, propenyl and the like. Di-lower alkylamino-lower alkyl comprehends groups such as, diethylamino-ethyl or dimethylamino-propyl and the like. The term aryl refers to phenyl and substituted phenyl groups, especially, lower alkyl substituted phenyl groups such as tolyl and the like. Similarly, the term ar-lower alkyl refers to groups such as benzyl, phenethyl and the like. Acyloxy preferably comprehends lower alkanoyl residues such as acetoxy and the like. Both the starting materials of Formula II and the Grignard compounds of Formula III belong to known classes of compounds.

The condensation in accordance with the invention is carried out, for example, by adding the ketone of Formula II either in solid, finely powdered form or in an indifferent solvent (such as, for example, absolute ether, benzene, tetrahydrofuran, dioxan) to the Grignard compound of Formula III which is present in a similar organic indifferent solvent. One can also proceed by adding the solution of the Grignard compound of Formula III to a solution of the ketone of Formula II. After the reaction is complete, the reaction product is subjected to the hydrolysis. The hydrolysis proceeds with particular advantage under substantially neutral conditions; for example, by addition of water or aqueous ammonium chloride solution. The basic end products of Formula I, which are dissolved in the organic phase, can be isolated via conventional means; for example, by evaporation of the solvent or extraction with a mineral acid and subsequent liberation of the base by decomposition with dilute alkali.

The tertiary carbinols obtained after the hydrolysis can be esterified or etherified in a further reaction step. Acylation agents which are applicable for the manufacture of esters are, for example, aliphatic (preferably lower alkyl) or aromatic carboxylic acid chlorides or anhydrides (such as acetyl chloride, benzoyl chloride, acetic anhydride etc.). Alkyl ethers can be manufactured by alcoholysis; for example, by treatment of an ester (e.g. an acetoxy compound) with an alcohol (preferably a lower alkanol, e.g. methanol, ethanol).

The tertiary carbinols of Formula I as well as their ethers and esters are basic substances which can be obtained mostly in a crystalline form. They are slightly soluble in water and also form crystalline water-soluble salts with the common organic or inorganic acids. Thus they form pharmaceutically acceptable acid addition salts with pharmaceutically acceptable acids, such as, for example, tartaric acid, citric acid, phosphoric acid, sulphuric acid, methanesulphonic acid, hydrobromic acid or hydrochloric acid.

Where racemic ketones of Formula II are used, the resulting products are likewise racemates. Optically active end-products can be obtained either by the splitting up of a racemate obtained in accordance with the invention or by using an optically active ketone II as starting material. The splitting up of a racemate into its optical antipodes can be carried out in the known manner; for example, by fractional crystallization of a salt of the racemic compound with an optically active acid such as dibenzoyl-D-tartaric acid, D-camphorsulphonic acid, D-tartaric acid. The present invention includes the manufacture not only of the racemate, but also of the optically active antipodes of the β-stereoisomeric series.

The β-stereoisomers of this invention can be administered internally (with dosage adjusted according to individual requirement), for example, in the form of pharmaceutical preparations which contain them or their pharmaceutically acceptable acid addition salts in admixture with a pharmaceutical, organic or inorganic, inert carrier material suitable for enteral or parenteral application—such as, for example, water, gelatin, lactose, starch, magnesium stearate, talc, vegetable oils, gums, polyalkylene glycols, vaseline, etc. The pharmaceutical preparations can be present in solid form (for example, as tablets, dragées, suppositories, capsules) or in liquid form (for example, as solutions, suspensions or emulsions). If desired they can be sterilized and/or contain additive materials such as conservation, stabilization, wetting or emulsification agents, salts for varying the osmotic pressure or buffers. They can also contain other therapeutically active substances.

The following examples are illustrative of the present invention but not limitative thereof. Various modifications will be apparent to those skilled in the art and are included within the scope of this invention. All temperatures are stated in ° C.

*Example 1*

In a round-flask fitted with stirrer, reflux condenser and dropping funnel, 12.1 g. of magnesium were covered over with abs. ether after the addition of a few granules of iodine and thereafter with 10 g. of methyl iodide. As soon as the reaction had set in, a solution of 61 g. of methyl iodide in 500 ml. of abs. ether was slowly added dropwise while stirring so that a continuous reaction took place. After the dissolution of the magnesium, the Grignard solution was added, while stirring, to a solution of 63.5 g. of 2 - oxo - 3 - isobutyl - 9,10 - dimethoxy-1,2,3,4,6,7 - hexahydro - 11bH - benzo[a]quinolizine of M.P. 126–128° in 1.5 l. of abs. tetrahydrofuran. The resulting mixture was subsequently stirred overnight at room temperature. Then, it was concentrated in a water-jet vacuum, the residue treated with 2 l. of ether and shaken with water. The ethereal solution was subsequently extracted with 2-N hydrochloric acid; then the basic portions in the hydrochloric acid extracts were liberated by the addition of caustic soda up to an alkaline reaction and extracted with benzene. The basic extract, which was obtained after the concentration of the benzene solution, was dissolved in isopropyl ether and left to stand overnight. There was thus obtained 36 g. of β-2-hydroxy-2-methyl-3-isobutyl-9,10-dimethoxy-1,2,3,4,6,7 - hexahydro - 11bH-benzo[a]quinolizine which melted at 116.5–117.5° after resolution from benzene/(petroleum ether). The hydrochloride, which was prepared in acetone with alcoholic hydrochloric acid, melted at 256–257°. The purity of the compound was proved by means of thin-layer chromatography.

The following compounds of the β-series of Formula I were obtained in the manner described above using the corresponding ketones of Formula II and the corresponding Grignard compounds of Formula III:

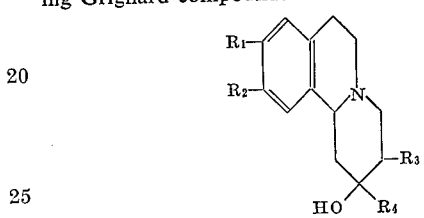

| R₁ | R₂ | R₃ | R₄ | Base melting point | Hydrochloride melting point |
|---|---|---|---|---|---|
| CH₃O | CH₃O | CH₃ | CH₃ |  | 248–249 |
| CH₃O | CH₃O | CH₃ | C₂H₅ | 101–102 | 235–236 |
| CH₃O | CH₃O | C₂H₅ | CH₃ |  | 225–226 |
| CH₃O | CH₃O | C₂H₅ | C₂H₅ | 131–132 | 215–216 |
| CH₃O | CH₃O | C₂H₅ | Isobutyl | 111–112 | 240 |
| CH₃O | CH₃O | C₂H₅ | Phenyl |  | 261 |
| CH₃O | CH₃O | Isopropyl | Methyl | 135–136 | 254 |
| CH₃O | CH₃O | n-Butyl | do | 106–107 | 225–226 |
| CH₃O | CH₃O | do | Ethyl | 117 | 220 |
| CH₃O | CH₃O | Isobutyl | do | 133 | 242–243 |
| CH₃O | CH₃O | do | n-Propyl | 144–145 | 250–252 |
| CH₃O | CH₃O | do | Isobutyl | 119–121 | 236–238 |
| CH₃O | CH₃O | do | Allyl | 135–136 | 237 |
| CH₃O | CH₃O | do | Benzyl | 131–133 | 232–234 |

The melting points of the starting ketones II used are the following:

2-oxo-3-methyl-9,10-dimethoxy - 1,2,3,4,6,7 - hexahydro-11bH-benzo[a]quinolizine: melting point of the base: 138–140°; melting point of the hydrochloride: 204–205°.

2-oxo-3-ethyl - 9,10 - dimethoxy - 1,2,3,4,6,7 - hexahydro-11bH-benzo[a]quinolizine: melting point of the base: 110–112°; melting point of the hydrochloride: 198–200°.

2-oxo-3-isopropyl-9,10 - dimethoxy - 1,2,3,4,6,7 - hexahydro-11bH-benzo[a]quinolizine: melting point of the base: 123–124°; melting point of the hydrobromide: 222–223°.

2-oxo-3-n-butyl - 9,10 - dimethoxy - 1,2,3,4,6,7-hexahydro-11bH-benzo[a]quinolizine: melting point of the base: 112–114°; melting point of the hydrochloride: 188–189°.

2-oxo-3-isobutyl - 9,10 - dimethoxy - 1,2,3,4,6,7 - hexahydro-11bH-benzo[a]quinolizine: melting point of the base: 126–128°; melting point of the hydrochloride: 196–197°.

*Example 2*

To 3.15 g. of Gilman alloy (activated) contained in 50 ml. of abs. ether there was added 14.5 g. of freshly distilled dimethylaminopropylchloride in such a manner that the reaction mixture was kept slightly boiling under reflux. Upon completion of the addition of dimethylaminopropylchloride, the solution was diluted with 150 ml. of absolute ether and stirred for half an hour at 40° C. A solution of 28.9 g. of 2-oxo-3-ethyl-9,10-dimethoxy-1,2,3,4,6,7-hexahydro - 11bH - benzo[a]quinolizine in 200 ml. of tetrahydrofuran was then added to the dilute solution, the latter still being kept at 40° C., whereupon the reaction mixture was allowed to stand overnight at a temperature of 60° C. The residue obtained upon evaporation of the solvent in a water-jet vacuum, was treated with 100 ml. of a saturated ammonium chloride solution and shaken out three times with 100 ml. of chloroform each. There were thus obtained 32.1 g. of β-2-hydroxy-2-(dimethylaminopropyl)-3-ethyl-9,10-dimethoxy - 1,2,3,4,6,7-hexahydro-11bH-benzo[a]quinolizine which was purified by means of aluminum oxide. Elution with 500 ml. of benzene gave 20.4 g. of a yellowish oil, the diphosphate crystallizing with 1 mole of water of crystallization. Upon recrystallization from methanol/water there was obtained 18.4 g. of colorless crystals melting at 230–232° C. (with decomposition). Formula of the product:

$$C_{22}H_{36}N_2O_3 \cdot H_6P_2O_8 \cdot H_2O$$

Example 3

12.7 g. of β-2-hydroxy-2,3-diethyl-9,10-dimethoxy-1,2,3,4,6,7 - hexahydro - 11bH - benzo[a]quinolizine were heated to 120° C. in a nitrogen atmosphere and with stirring, for 12 hours, together with 6 g. of dry, finely powdered sodium acetate in 150 ml. of acetic anhydride. Then, the reaction mixture was evaporated in vacuo to dryness, and the residue obtained was taken up in dilute hydrochloric acid while being cooled with ice-water, and washed with ether. The product was subsequently taken up in ether, whereupon the ether was evaporated. The residue obtained was made to crystallize from isopropyl ether, whereby 10 g. of the acetic ester of the starting compound were obtained. Melting point: 93–94° C.

The HCl-salt of this compound, which was obtained with hydrochloric acid in methanol/ether, melted at 225–226° C.

The propionic ester, melting at 92–93° C., was obtained in a similar manner by reacting β-2-hydroxy-2,3-diethyl-9,10-dimethoxy-1,2,3,4,6,7 - hexahydro - 11bH - benzo[a]quinolizine with propionyl chloride.

We claim:

1. A compound selected from the group consisting of the β-series of stereoisomeric compounds of the formula

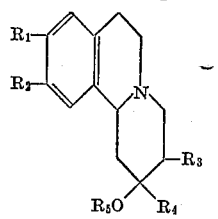

wherein $R_1$ and $R_2$ are selected from the group consisting of, individually, hydrogen, hydroxy lower alkanoyloxy, lower alkyl, lower alkoxy and taken together, lower alkylenedioxy; $R_3$ is selected from the group consisting of lower alkyl, lower alkenyl and di-lower alkylamino-lower alkyl; $R_4$ is selected from the group consisting of lower alkyl, lower alkenyl, benzyl, phenethyl, phenyl, lower alkyl-substituted phenyl and di-lower alkylamino-lower alkyl and $R_5$ is selected from the group consisting of hydrogen, lower alkanoyl, benzoyl and lower alkyl and pharmaceutically acceptable acid addition salts thereof.

2. A β-stereoisomeric compound of the formula

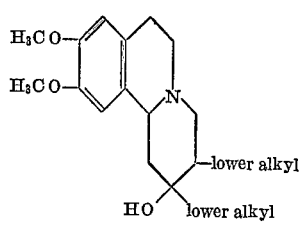

3. β-2-hydroxy-2,3-diethyl-9,10 - dimethoxy-1,2,3,4,6,7-hexahydro-11bH-benzo[a]quinolizine.
4. β-2 - hydroxy-2-isobutyl - 3-ethyl-9,10 - dimethoxy-1,2,3,4,6,7-hexahydro-11bH-benzo[a]quinolizine.
5. β-2 - hydroxy-2-methyl-3 - isobutyl-9,10 - dimethoxy-1,2,3,4,6,7-hexahydro-11bH-benzo[a]quinolizine.
6. β - 2-hydroxy - 2-methyl-3 - ethyl-9,10 - dimethoxy-1,2,3,4,6,7-hexahydro-11bH-benzo[a]quinolizine.
7. β-2 - hydroxy - 2-ethyl-3 - methyl-9,10 - dimethoxy-1,2,3,4,6,7-hexahydro-11bH-benzo[a]quinolizine.
8. A β-stereoisomeric compound of the formula

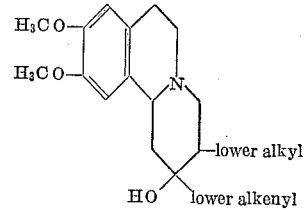

9. β-2 - hydroxy-2 - allyl-3 - isobutyl-9,10 - dimethoxy-1,2,3,4,6,7-hexahydro-11bH-benzo[a]quinolizine.
10. β-2-hydroxy - 2-(dimethylamino-propyl) - 3-ethyl-9,10-dimethoxy - 1,2,3,4,6,7 - hexahydro-11bH - benzo[a]quinolizine.

11. A process for the preparation of a β-stereoisomeric compound of the formula

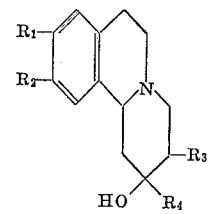

where $R_1$ and $R_2$ are selected from the group consisting of, individually, hydrogen, hydroxy, lower alkanoyloxy, lower alkyl, lower alkoxy and taken together, lower alkylene-dioxy; $R_3$ is selected from the group consisting of lower alkyl, lower alkenyl and di-lower alkylamino-lower alkyl and $R_4$ is selected from the group consisting of lower alkyl, lower alkenyl, benzyl, phenethyl, lower alkyl-substituted phenyl and di-lower alkylamino-lower alkyl and pharmaceutically acceptable acid addition salts thereof;

which comprises reacting a 2-oxo-benzo[a]quinolizine of the formula

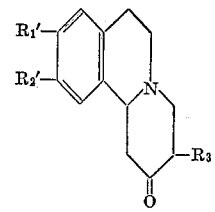

wherein $R'_1$ and $R'_2$ are selected from the group consisting of, individually, hydrogen, lower alkanoyloxy, lower alkyl, lower alkoxy and taken together, lower alkylenedioxy and $R_3$ has the same meaning as above;

with a Grignard compound of the formula

R_4-Mg-Halogen wherein $R_4$ has the same meaning as above and subjecting the so-obtained condensation product to hydroylsis.

References Cited by the Examiner
UNITED STATES PATENTS
2,997,475   8/61   Brossi et al. _____ 260—289

NICHOLAS S. RIZZO, *Primary Examiner.*

UNITED STATES PATENT OFFICE
CERTIFICATE OF CORRECTION

Patent No. 3,209,005　　　　　　　　　　　　September 28, 1965

Arnold Brossi et al.

It is hereby certified that error appears in the above numbered patent requiring correction and that the said Letters Patent should read as corrected below.

Column 1, line 62, for "wherea" read -- whereas --; column 2, lines 3 to 11, the formula should appear as shown below instead of as in the patent:

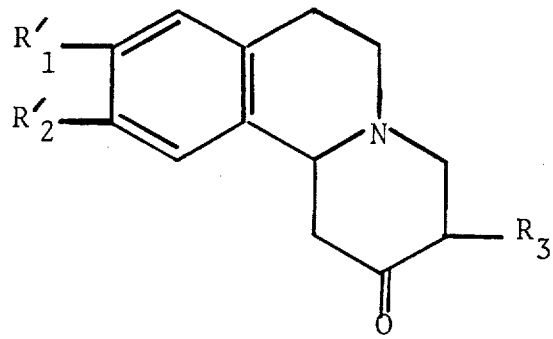

column 6, line 38, for "where" read -- wherein --.

Signed and sealed this 25th day of October 1966.

(SEAL)
Attest:

ERNEST W. SWIDER　　　　　　　　　　　　　　EDWARD J. BRENNER
Attesting Officer　　　　　　　　　　　　　Commissioner of Patents